United States Patent
Bassman et al.

(10) Patent No.: US 6,578,099 B1
(45) Date of Patent: Jun. 10, 2003

(54) METHOD AND COMPUTER SYSTEM FOR SAFELY HOT-PLUGGING ADAPTER CARDS

(75) Inventors: Robert G. Bassman, Austin, TX (US); Tuyet-Huong T. Nguyen, Austin, TX (US); Wai-Ming R. Chan, Austin, TX (US); Prakash Chauhan, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/477,756

(22) Filed: Jan. 4, 2000

(51) Int. Cl.$^7$ ............................................. G06F 13/00
(52) U.S. Cl. ...................................... 710/301; 710/303
(58) Field of Search .................................. 710/300–304

(56) References Cited

U.S. PATENT DOCUMENTS

| 5,237,690 A | | 8/1993 | Bealkowski et al. ......... 395/700 |
| 5,303,171 A | | 4/1994 | Belt et al. .................... 364/707 |
| 5,560,022 A | * | 9/1996 | Dunstan et al. .............. 710/301 |
| 5,634,137 A | | 5/1997 | Merkin et al. ............... 395/830 |
| 5,671,368 A | * | 9/1997 | Chan et al. .................. 710/100 |
| 5,768,541 A | | 6/1998 | Pan-Ratzlaff ................ 395/283 |
| 5,796,185 A | | 8/1998 | Takata et al. ................ 307/140 |
| 5,805,903 A | | 9/1998 | Elkhoury ................ 395/750.01 |
| 5,862,349 A | | 1/1999 | Cho et al. .................... 395/283 |
| 5,862,393 A | * | 1/1999 | Davis .......................... 710/302 |
| 5,909,584 A | | 6/1999 | Tavallaei et al. ........ 395/750.01 |
| 5,940,586 A | | 8/1999 | Bealkowski et al. ... 395/182.03 |
| 6,308,240 B1 | * | 10/2001 | De Nicolo ................... 710/300 |

* cited by examiner

Primary Examiner—Rupal Dharia
(74) Attorney, Agent, or Firm—Baker Botts L.L.P.

(57) ABSTRACT

A computer system and a method for allocating power to hot-plugged adapter cards placed in a card slot so as to delay, the power allocation until a user is clear of the adapter card. The computer system conventionally includes a processor, a card slot in data communication with the processor, a memory in data communication with the processor, and a power supply in electrical communication with the processor. The memory stores computer-readable data that includes code to be operated on by the processor to allocate power to the card slot upon both a detection of a change of state of the card slot and the occurrence of a predefined system event. The predefined system event is typically a system interrupt that is generated in response to an activation of a switch in electrical communication with the processor.

12 Claims, 8 Drawing Sheets

METHOD AND COMPUTER SYSTEM FOR SAFELY HOT-PLUGGING ADAPTER CARDS

BACKGROUND OF THE INVENTION

1. Field of the Invention

The present invention relates to computers. More specifically, the invention relates to devices and methods for controlling power allocation to expansion slots in a computer system having hot-plug capability.

2. Description of the Related Art

Computer systems are an integral part of the day-to-day operations of most businesses. Often such systems are tailored for use by a particular business through the addition of various peripheral devices and other computer systems via communication buses. The peripheral devices are generally connected to the communication buses by an adapter card coupled to an expansion or card slot. These peripheral devices have often been the cause of data corruption and/or system down-time. This resulted in the insertion and removal of the adapter cards associated with the failed peripheral devices, which historically, has required powering down the computer system.

This often results in loss of productive work by staff.

To facilitate adapter card manipulation while reducing computer system down-time, a "Hot-Plug" specification has been adopted which sets forth devices and structures to allow adapter card manipulation without terminating power to the computer system. One such specification is a PCI (Peripheral Component Interconnect) Hot-Plug specification which sets standards for aspects of removal and insertion of PCI adapter cards while the system is running. The Hot-Plug specification is applicable to a variety of computer systems and is typically implemented in server-based systems. It defines a sequence of user actions and system management facilities that inform the operating system of an intention to insert of remove an adapter card.

Adapter cards are not generally designed to be connected to a slot that is already powered. Accordingly, the Hot-Plug specification defines a sequence of user actions and system behavior to ensure the removal of power to a slot before adapter card manipulation.

The insertion of an adapter card, however, poses a risk to both a user and computer system during power allocation. The user may unintentionally contact power traces or pins on the adapter card if power is allocated thereto at an arbitrary time. This poses a risk of harm to the user, as well as a risk that the computer system may be damaged.

What is needed, therefore, is a device and method that prevents allocation of power to a card slot until the risk of exposing a user to the biasing power has abated.

SUMMARY OF THE INVENTION

A computer system and a method for allocating power to hot-plugged adapter cards placed in a card slot that features delaying the power allocation until a user is clear of the adapter card. In this manner, risk of harm to the user, as well as a risk that the computer system may be damaged, is greatly reduced. To that end, the computer system includes a processor, a card slot in data communication with the processor, a memory in data communication with the processor, and a power supply in electrical communication with the processor. The card slot is in one of two operational states associated with it. In one state, an adapter card is disposed in the card slot, defining a connected state. In the remaining state, an adapter card is not present in the card slot, defining an unconnected state. The memory stores computer-readable data that includes code to be operated on by the processor to allocate power to the card slot upon both a detection of a change of state of the card slot and the occurrence of a predefined system event. The predefined system event is typically a system interrupt that is generated by an activation of a switch.

In a first embodiment, the switch comprises the computer system's power button. Upon sensing that one or more card slots have changed states, first interrupt, such as a System Management Interrupt (SMI) is generated that is sensed by the processor. The processor then executes a subroutine that reconfigures the power button to generate a second SMI upon activation of the power button. Upon sensing the second SMI the processor allocates power to the card slots that changed states. After allocation of power, additional signals received from the power button would be interpreted to power-down or power-up the computer system. Were the power button to include a light emitting element, such as a light emitting diode (LED), the processor would also execute a subroutine, after receiving the first SMI, to cause the LED to periodically flash or vary intensity. In this manner, a physically perceivable stimulus is generated. The stimulus would alert a user that the computer system is ready to allocate power to an adapter card that had just been hot-plugged into a card slot. Alternatively, an audible or other physical stimulus could be provided to the user, indicating that the computer system is ready to allocate power to the aforementioned card slot.

In another embodiment, the switch is one of a plurality of switches associated with the individual keys of a keyboard. As with the power button, upon one or more card slots changing states, an interrupt, such as an SMI is generated that is sensed by the processor. The processor executes a subroutine that interprets the signals received from the keyboard. Were the signals to correspond to a predetermined sequence of keys, the memory would then invoke a subroutine that would allocate power to the card slots that changed states.

In a third embodiment, the switch is connected between a moveable panel and a frame of a chassis of the computer system. The chassis houses the card slot, the memory and the power supply. The moveable panel has two positions, breached and secured. The switch has one of two modes, each of which is uniquely associated with one of the two positions. The system event occurs when the switch is in the mode associated with the moveable panel being in the secured position.

These and other embodiment of the present invention, along with many of its advantages and features, are described in more detail below and are shown in the attached drawings.

DESCRIPTION OF THE INVENTION

Figure 1:
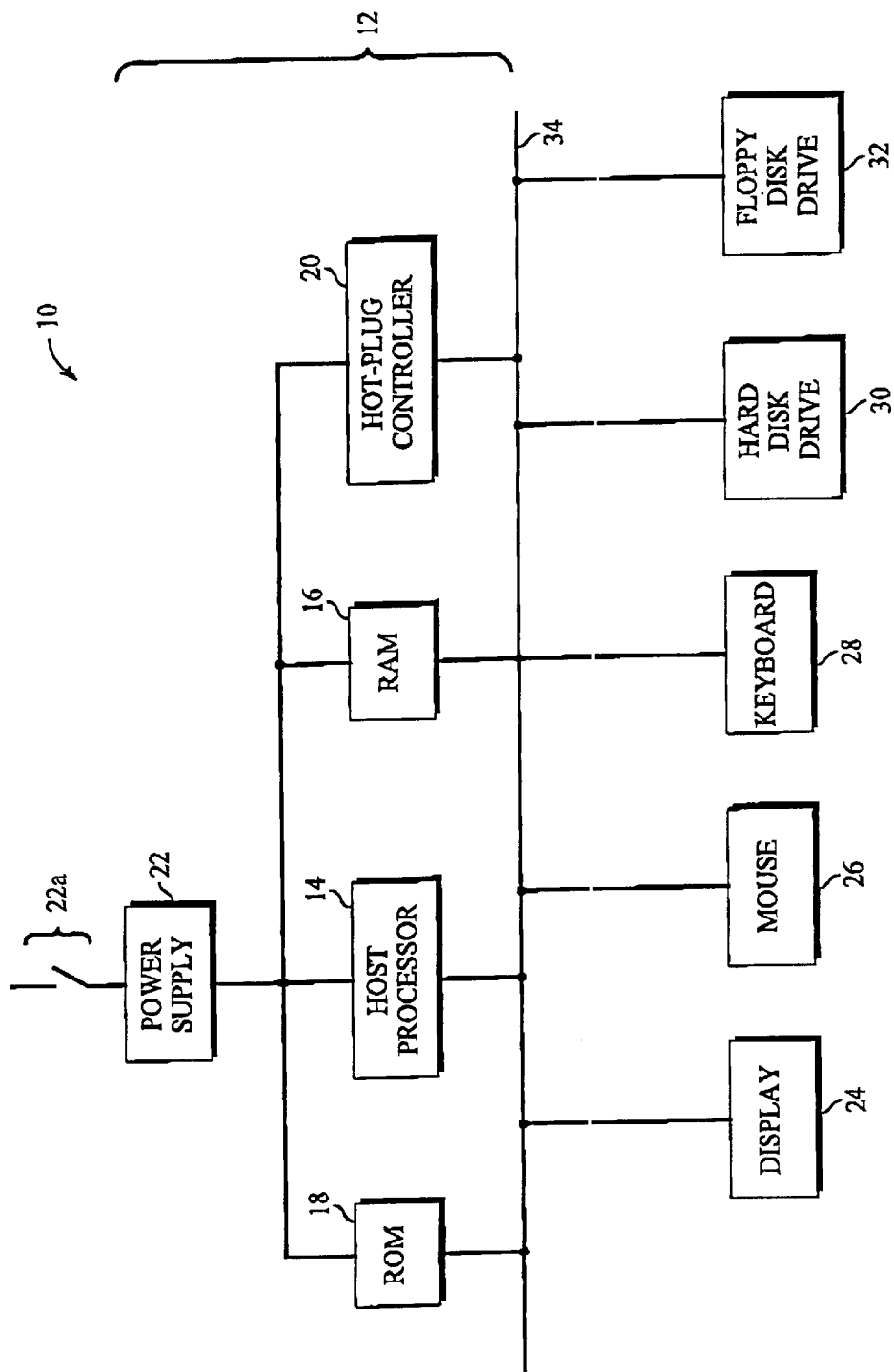
FIG. 1 is a simplified view of a computer system employed in accordance with the present invention.

FIG. 1 shows a computer system 10 that is suitable for implementing the present invention. The computer system 10 includes a hardware platform 12 that has a host processor 14, random access memory (RAM) 16, read only memory (ROM) 18, a hot-plug controller 20, and a plurality of peripheral devices, all of which are biased by the power supply 22. Biasing power is allocated to the various components 12 and the peripheral devices by activating the power button 22a that is in electrical communication with the power supply 22. Examples of the peripheral devices include a display 24, a mouse 26, a keyboard 28 having a plurality of keys (not shown) associated therewith, as well as a hard disk drive 30 and a floppy disk drive 32. All of the components are in data communication with one another over a common bus 34. Although any type of bus architecture may be employed, typically the bus 34 is a Peripheral Components Interconnect (PCI) bus.

Figure 2:
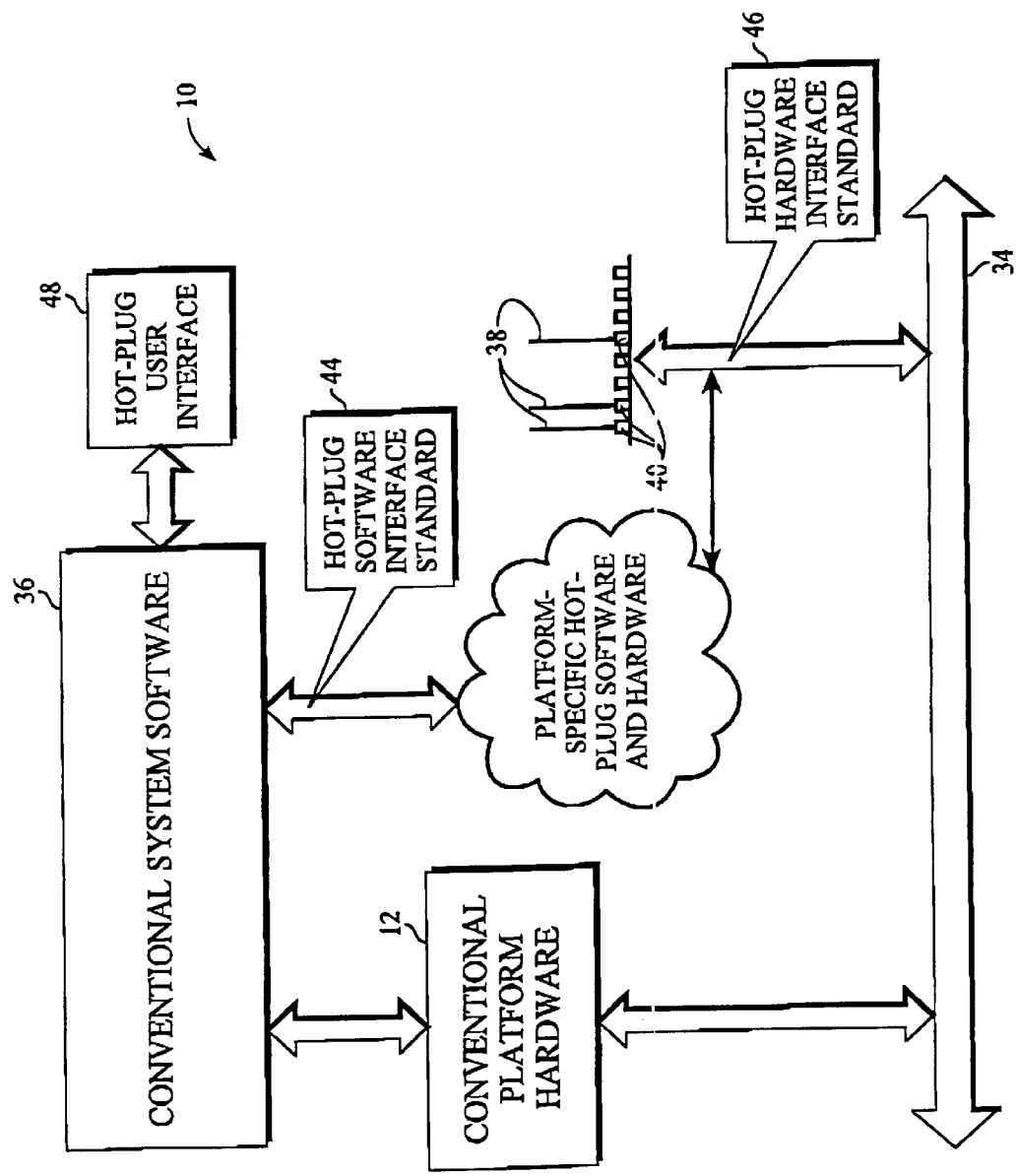
FIG. 2 is a simplified view illustrating hardware and software components that include the computer system shown above in FIG. 1 in accordance with the present invention.

Referring to both FIGS. 1 and 2, the computer system 10 includes conventional system software 36 that may be stored, for example, on the hard disk drive 30 and loaded into RAM 16 upon power-up of the computer system 10. Example of system software may include applications, system management functions, operating systems, and peripheral device drivers for controlling peripheral devices. The hardware platform 12 facilitates communication between the peripheral devices and systems software 36 over the PCI bus 34 with the use of adapter cards 38. The adapter cards 38 are disposed in a card slot 40 connected to the PCI bus 34.

An advantage with the PCI bus 34 is that hot-plugging may be facilitated. For purposes of the present invention, hot-plugging is defined as insertion and removal of the adapter card 38 while biasing power is applied to the computer system 10 and various components of the hardware platform 12 and peripheral devices. To that end, the computer system 10 includes platform-specific hot-plug software and hardware 42. The platform-specific hot-plug software and hardware 42 controls power and bus connections on the card slots 40.

A hot-plug software interface standard 44 facilitates communication between the system software 36 and the platform-specific hot-plug software and hardware 42. The interface standard 44 specifies information content of requests and responses crossing the interface.

Communication between the card slots 40 and the platform-specific hot-plug software and hardware 42 is facilitated by a hot-plug hardware interface bus 46. The PCI specification generally defines the hot-plug hardware interface bus 46. Specifically, the PCI bus specification requires a present signal PRSNT[1:2]# connection associated with each adapter card slot. One or both of the PRSNT[1,2]# bits is to be grounded by each of the adapter cards 38 to indicate that the card is present in the card slot 40 and to indicate the amount of power the adapter card 38 utilizes. The platform-specific hot-plug software and hardware platform reads the pins to determine which card slots 40 are occupied and the amount of power used by the adapter cards 38 present. To recognize newly installed adapter cards 38, i.e., adapter cards 38 that were installed before power is allocated to the computer system 10, a platform configuration routine (not shown) is employed. A hot-plug user interface 48 supports interactions between a user and the conventional system software 36.

Figure 3:
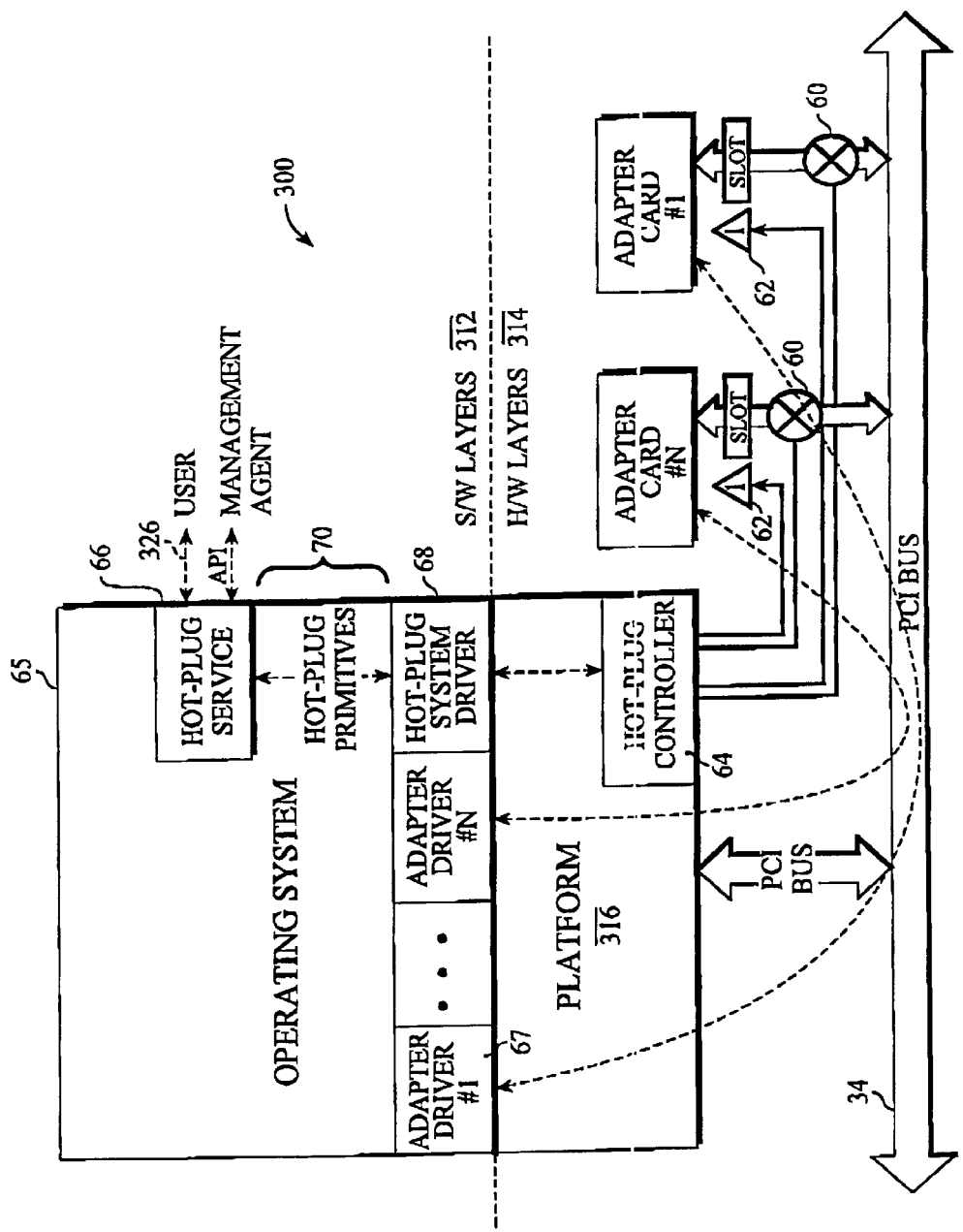
FIG. 3 is a view showing details of the software components shown above in FIG. 2 illustrating the software interconnections.

Referring to FIGS. 2 and 3 a plurality of card slots 40 are shown, each of which may be selectively isolated from the bus 34 to facilitate manipulation of the adapter card 38 while minimizing the risk of data loss and harm to the user. To that end, one of several forms of slot identification may be included and device drivers 39 are associated therewith. These include a physical slot identifier, bus and device number, or a logical slot identifier. Each of the aforementioned identifications should have a unique identifier corresponding to a particular card slot 40 so that it may be distinguished from the remaining card slots. The card slot identifier may include a slot number in a single-chassis system or a combination of chassis identifier and slot number in a multiple-chassis system.

In electrical communication with each of the card slots 40 is power switch 60-9, 60-b, etc. Power switch is connected between the associated adapter card slot 40 and the interface bus 46. In accordance with the PCI specification, an attention indicator 62 is associated with each of the card slots 40. The attention indicators 62 provide a physically perceivable signal to a user.

The platform-specific hot-plug software and hardware 42 includes a hot-plug controller 64. The hot-plug controller 64 is a hardware (circuitry) subsystem that controls the allocation of biasing power and other signals to the card slots 40. To that end, the hot-plug controller 64 communicates with the power switches 60 and the attention indicators 62 over buses 34 and 46. Although a single hot-plug controller 64 typically controls more than one card slot 40, multiple hot-plug controllers may be included.

The hot-plug controller 64 operates under control of hot-plug service 66 software that is also included in the platform-specific hot-plug software and hardware 42. Specifically, the hot-plug service 66 includes a hot-plug system driver 68 that controls and monitors the hot-plug controller 64. The hot-plug service 66 also facilitates monitoring and controlling hot-plug operations through the use of hot-plug primitives 70. The hot-plug primitives 70 are specific requests issued by the hot-plug service 66 to the hot-plug system driver 68 to determine the status and to control the card slots 40. To that end, the hot-plug primitives 70 include several parameters, such as a card slot identifier that activates/deactivates the selected card slots 40. The hot-plug primitives also define what information passes between the hot-plug service 66 and the hot-plug system driver 68. User communication with the hot-plug service 66 is achieved using the hot-plug user interface 48.

Before an adapter card 38 is removed from a card slot 40, communication between the operating system 65 and the adapter card 38 should cease, and the power to the card slot 40 associated therewith should be terminated. The sequence of activity employed to cease communication to a card slot is referred to as "quiescing". Quiescing typically includes cessation of new request issued by the computer system 10's components to the adapter driver 39 or notification of the adapter driver 39 to stop accepting new requests, completion or termination of outstanding requests by the adapter driver 39, and the adapter driver 39 placing the adapter card 30 in an inactive state. In the inactive state, the adapter card 38 does not appropriate interrupts or bus activity. When the adapter driver 39 is quiesced, the driver no longer issues bus transactions to the adapter card 38, even if another device sharing the same interrupt input terminal generates an interrupt. An adapter driver 39 that controls multiple adapter cards 38 quiesces only the binding for the selected, i.e., appropriate, adapter card 38.

Figure 4:
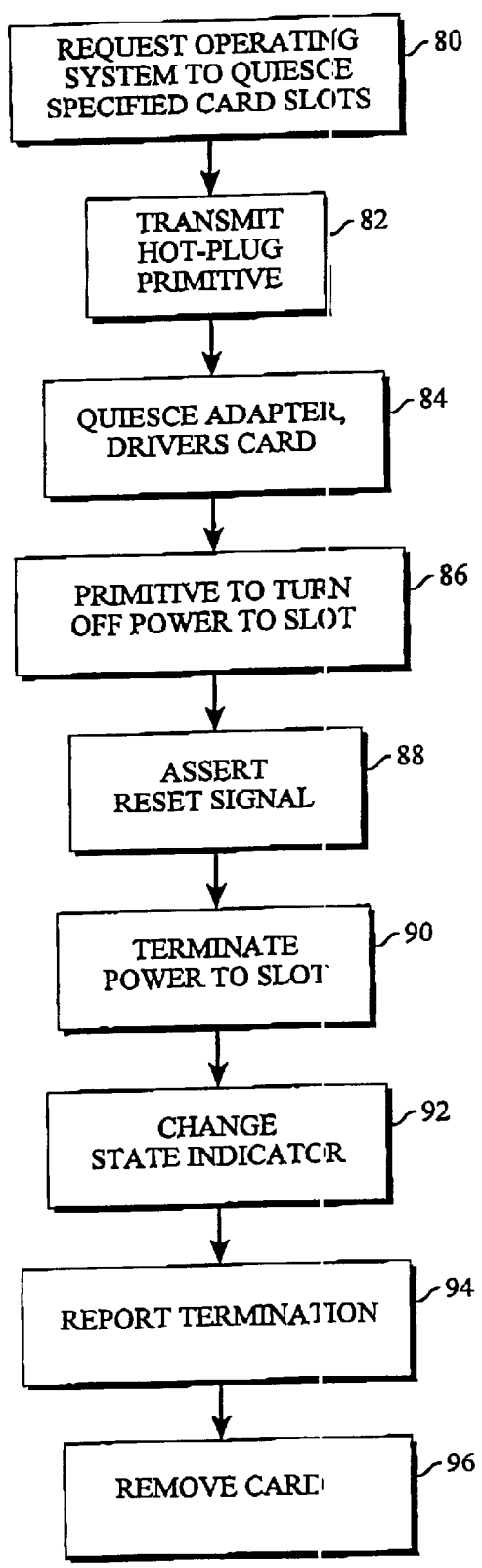
FIG. 4 is a flowchart showing a general sequence of operations for removing an adapter card from a card slot in a hot-plug system in accordance with the present invention.

Referring to FIGS. 3 and 4, a user initiates a hot-plug operation to remove an adapter card 38 by sending a request to the operating system 65 to quiesce activity on one or more of the card slots 40 at step 80. In response to a request to quiesce, the hot-plug service 66 issues hot-plug primitives 70 to a hot-plug system driver 68 at step 82. In response to the hot-plug primitives 70, the operating system 65 functions to quiesce an appropriate adapter driver 39 and associated adapter card 38, at step 84. One of the hot-plug primitives 70 transmitted by the hot-plug service 66 is interpreted by the hot-plug system driver 68, which terminates the biasing power to the appropriate card slot 40, at step 86. At step 88, the hot-plug system driver 68 causes hot-plug controller 64 to assert a reset RST# signal and the appropriate card slot 40 is isolated from the bus 34. The RST# signal may either be asserted before, or after, the appropriate card slot 40 is isolated.

At step 90 the hot-plug controller 64 terminates power to the appropriate card slot 40. Optionally, at step 92, the hot-plug controller 64 may vary a slot-status indicator 62 to signal that power is terminated to the card slot 40. The command to control the change status indicator may be included with additional commands sent to the card slot 40 from the hot-plug controller 64 to set status of the same. The hot-plug service may report to the user that power to the appropriate card slot 40 is terminated using, in addition to the change status indicator, the user interface 48, at step 94. Additional information, however, may be reported to the user via the user interface 48 indicating faults. Examples of the aforementioned faults include a fault due to wrong power frequency, a fault due to insufficient available power, a fault due to insufficient configuration resources, a power failure fault, and a general failure fault. Finally, assuming that the user is notified at step 94 that power has been terminated, the user removes the adapter card 38 from the card slot 40 at step 96. In this manner, the aforementioned card slot 40 has undergone a state change from connected, i.e., having an adapter card 38 present therein to unconnected, i.e., having no adapter card 38 present.

Figure 5:
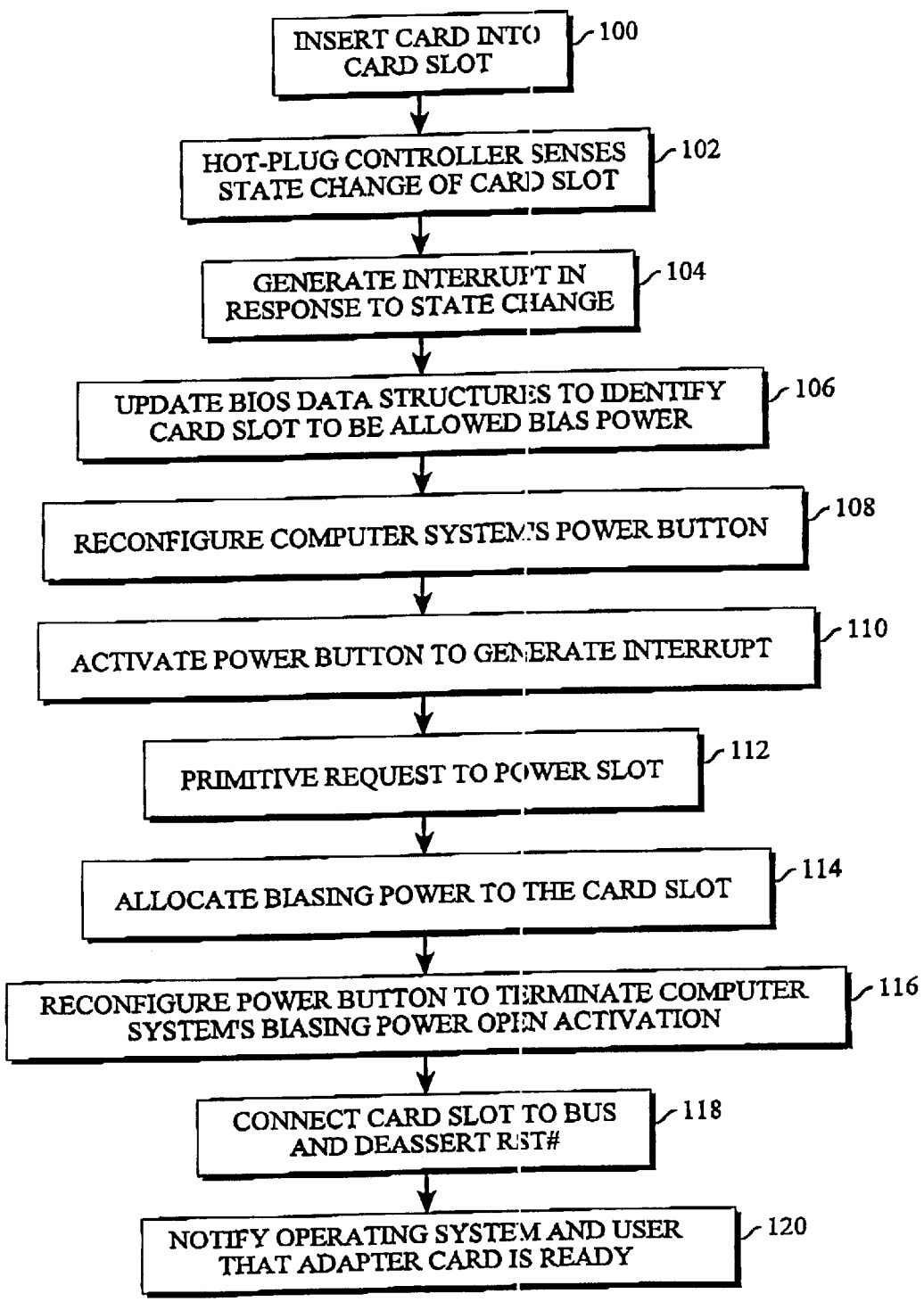
FIG. 5 is a flowchart showing a general sequence of operations for allocating biasing power to a card slot in accordance with the present invention.

Referring to FIGS. 1, 3 and 5, hot-plugging an adapter card 38 into a card slot 40 that has an unconnected state varies, depending upon the computer system. Typically, however, a user inserts an adapter card 38 into a corresponding card slot 40 at step 100. At step 102, the hot-plug controller 64 identifies a state change of the card slot 40 indicating that a hot-plug adapter card 38 is present. A problem addressed by the present invention concerns a delay in allocating biasing power to the adapter card 38 until such time that the spatial position of a user with respect to the aforementioned adapter card 38 is appropriate. This reduces the possibility of the user unintentionally contacting the bias power allocated to the adapter card 38 or card slot 40. To that end, at step 104, an interrupt is generated in response to the hot-plug controller 64 sensing the manipulation of the adapter card 38. The interrupt is sensed by the processor 14 that executes the SMI handler code stored in RAM 16. The SMI handler code is set-up. by the BIOS,stored in ROM 18. In this manner, the BIOS vis-a-vis the SMI handler code, updates data structures that identify the card slots 40, which underwent a state change, to be allocated bias power at step 106. At step 108, the BIOS reconfigures the computer system 10's power button 22a, vis-a-vis the SMI handler code, to prevent the same from terminating power to the computer system 10 when activated. Rather, the power button is reconfigured so that an interrupt is generated when activated by the user without altering the operation of the computer system 10's power supply. Additionally, the user may be made aware that the adapter card 38 is ready for allocation of power at step 108. This may be provided by any known physically perceivable stimuli. For example, were the power button to include a light emitting diode, the BIOS could configure same to vary intensity periodically. The periodicity of the variance of the intensity could indicate which card slot 40 will be powered or how many card slots 40 will be powered or both. Alternatively, an LED located elsewhere on the computer system may be employed, e.g., LEDs on the keyboard. An audible signal may be provided, as well, that provides the aforementioned information. Exemplary pseudo code defining, the subroutine stored in ROM 18 that carries-out the functions of steps 102, 104, 106 and 108 is as follows:

```
if (event "PCI card insert") then {
    Update "fresh card added on slot n" bitmap
    Call routine to reconfigure soft-off power button to user input
    mode
    Call routine to flash the power led to indicate the user input
    mode to user
    return
}
```

Were state changes for multiple hot-plugged adapter cards 38 sensed, then the subroutine would be repeated multiple times, i.e., once for each newly hot-plugged adapter card 38. In this manner, steps 104, 106 and 108 are carried out for each newly hot-plugged adapter card 38 for which an interrupt is generated.

When the user is clear of the newly added adapter card 38 and the card slot 40 associated therewith, the power button may be activated, at step 110 which transmits an interrupt to the BIOS. In response to receiving the second interrupt, the BIOS communicates with the hot-plug service 66 to issue a hot-plug primitive 70 to the hot-plug system driver 68 requesting the same to allocate biasing power to the appropriate adapter card slot, at step 112. In response, the hot-plug system driver 68 uses the hot-plug controller 64 to power the adapter card slot, at step 114. The BIOS ceases the aforementioned optional physically perceivable stimuli and reconfigures the power button 22a to terminate power to the computer system 10 upon subsequent activation, at step 116. In addition, at step 116, the hot-plug controller 64 modifies the slot-status indicator signal 62 to show that the card slot 40 is powered. Exemplary pseudo code defining the subroutine stored in ROM 18 that carries-out the functions of steps 110, 112, 114 and 116 is as follows:

```
if (event "soft power button pressed") then {
    If (power button reconfigured) then {
        Look at "fresh added slots" bitmap
        Send power Up command to all freshly added cards
```

```
        reconfigure power switch to normal mode
        stop flashing power LED and return to solid green
        return
    }
    else if (power button in normal state) then
Power down system
}
```

At step 118, hot-plug controller 66 de-asserts the reset signal RST# on the appropriate card slot 40 and connects the aforementioned card slot 40 to the bus 34. The operations of de-asserting the RST# signal and connecting the card slot 40 to the bus 34 may occur in any order. The appropriate adapter driver 39 verifies that the appropriate adapter card 38 has completed internal initialization before the driver 39 uses the same. The adapter driver 39 may become active sooner after a hot-insertion than after power is initially applied to the system. At step 120, the hot-plug service 66 may notify both the operating system 65 and the user the newly hot-plugged adapter card 38 is ready for use.

Figure 6:
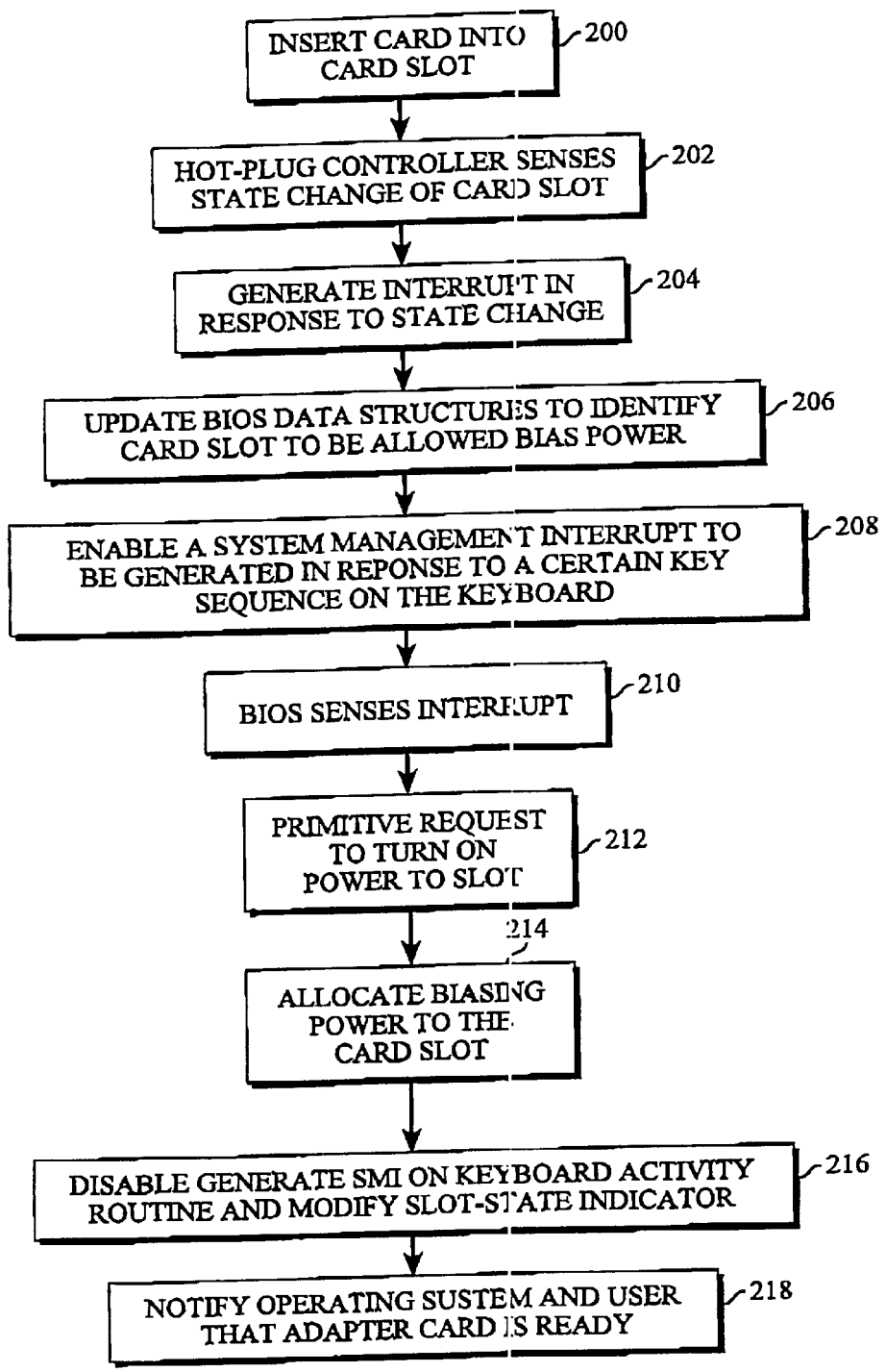
FIG. 6 is a flowchart showing a general sequence of operations allocating biasing power to a card slot in accordance with a first alternate embodiment of the present invention.

Referring to both FIGS. 1, 3 and 6, another embodiment for allocating power to a card slot 40 that has undergone a state change uses switches associated with the various keys on the keyboard 28, instead of the switch associated with computer system 10's power button 22*a*. In this manner, steps 200, 202, 204 and 206 are the same as steps 100, 102, 104 and 106, discussed above with respect to FIG. 5. At step 208, however, of FIG. 6 the BIOS calls a routine that enables a System Management Interrupt (SMI) to be generated when a certain key sequence is sensed. Upon sensing the aforementioned interrupt, at step 210, the BIOS processes information associated with the keyboard activity, at step 212. In this manner, the BIOS communicates with the hot-plug service 66 to issue a hot-plug primitive 70 to the hot-plug system driver 68 requesting the same to allocate biasing power to the appropriate card slot 40, at step 212. In response, the hot-plug system driver 68 uses the hot-plug controller 64 to power the card slot 40 at step 214.

After power has been allocated, at step 216 the BIOS disables the generate SMI on keyboard activity routine and the hot-plug controller 64 may modify the slot-status indicator signal 62 to show that the card slot 40 is powered. At step 218, the hot-plug service 66 may notify both the operating system 65 and the user the newly hot-plugged adapter card 38 is ready for use. Exemplary pseudo code defining the subroutine stored in ROM 18 that carries-out the functions of the aforementioned steps is as follows:

```
if (event "PCI card insert") then {
        Update "fresh card added on slot n" bitmap
        Call routine to enable System Management interrupt on
        keyboard certain key sequence
    return
}
if (event "certain key sequence pressed") then {
        If ("power on key-sequence) then {
            Look at "fresh added slots" bitmap
            Send power Up command to all freshly added cards
            Disable System Management Interrupt on keyboard activity
            return
        }
        else {
            Do nothing
            return
        }
}
```

An advantage with the method shown in FIG. 6 is that it restricts hot-plugging to authorized users by requiring a predefined key sequence to be entered before allocating biasing power to an adapter card. However, any key sequence may be used, including a single key stroke from any key of the keyboard. In this manner, the aforementioned method may abrogate restricting access to hot-plugging operations.

Figure 7:
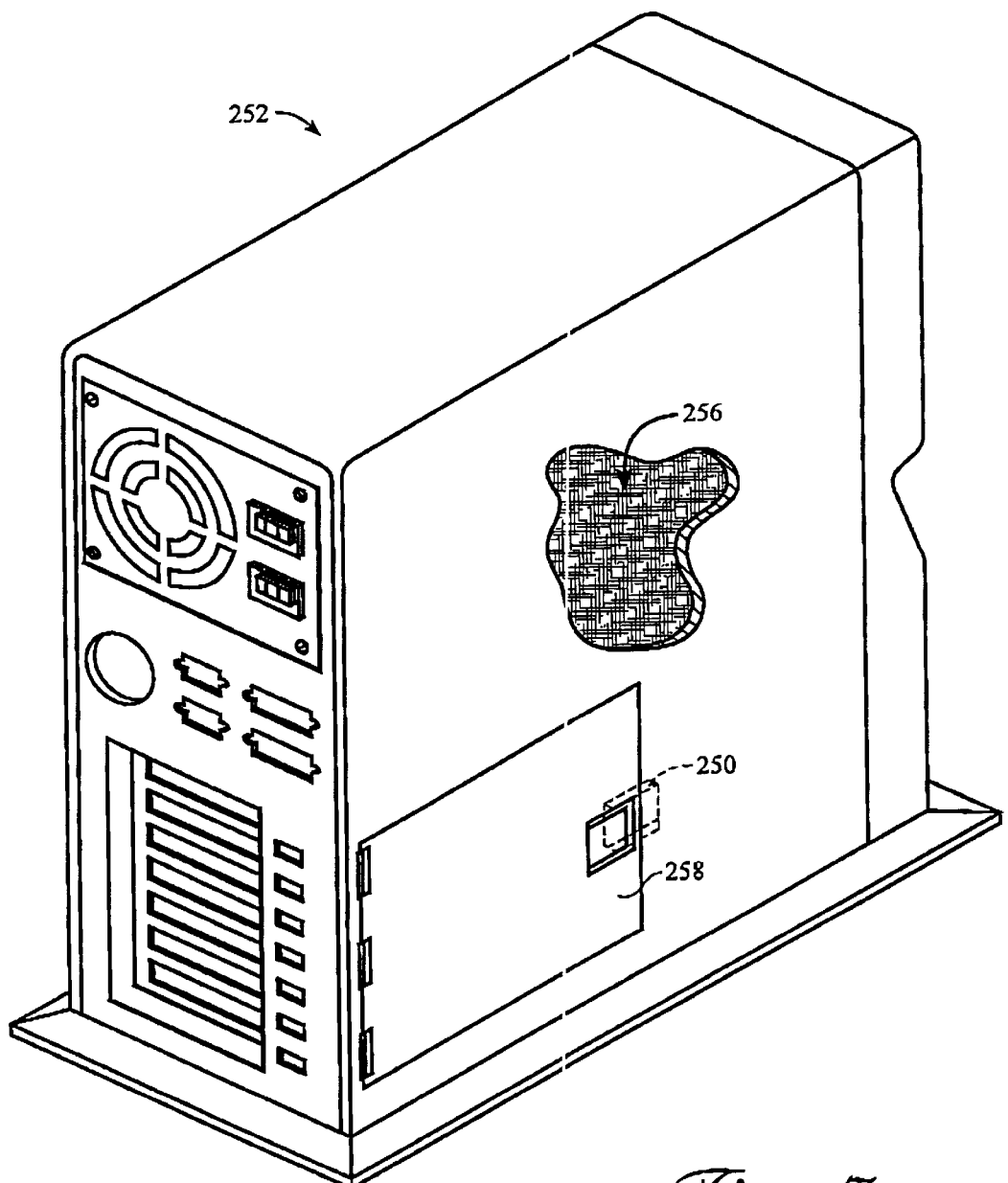
FIG. 7 is a perspective view showing a computer chassis in accordance with the present invention.

Referring to FIGS. 1 and 7, in yet another embodiment, the switch employed may be housing intrusion switch 250. Specifically, the computer system 10 is typically housed in a computer chassis 252, which is shown as a "tower" configuration simply for illustration. Any suitable configuration of computer chassis may be used. The computer chassis 252 has a wall 254 which defines a chamber 256. The wall 254 includes a moveable panel 258 that has two positions, breached and secured. In the breached position, the moveable panel 258 allows ingress into the chamber 256. In the secured position, access to the chamber 256 is restricted. Coupled between the wall 254 and the moveable panel 258 is the housing intrusion switch 250. The switch has one of two modes, each of which is uniquely associated with one of the two positions. The advantage of providing the intrusion switch 250 is that it may be employed to prevent allocating biasing power to a newly hot-plugged adapter card 38, shown in FIG. 3, until the switch is in the mode associated with the secured position. As a result, biasing power is not allocated to a newly hot-plugged adapter card 38 until an interrupt is received from the switch 250 of FIG. 7, indicating that the moveable panel 258 is in the secured position has been sensed by the BIOS.

Figure 8:
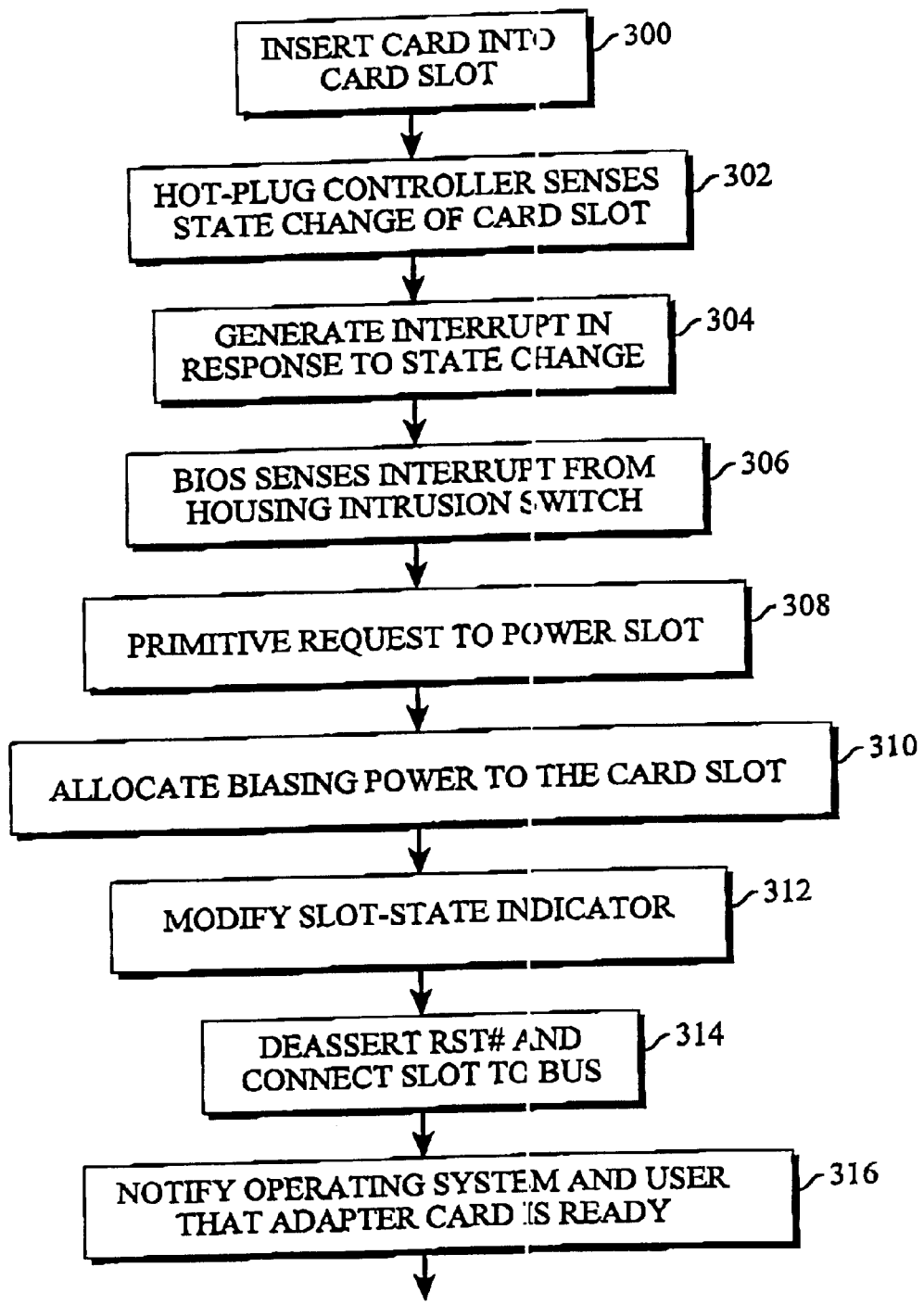
FIG. 8 is a flowchart showing a general sequence of operations allocating biasing power to a card slot in accordance with a second alternate embodiment of the present invention.

Referring to FIGS. 5 and 8, steps 300, 302 and 304 are identical to steps 100, 102 and 104. Referring to FIGS. 3, 7 and 8, at step 306, the BIOS senses the interrupt from the switch 250 indicating that the moveable panel 258 is in the secured position. Upon receiving the interrupt, the BIOS communicates with the hot-plug service 66 to issue a hot-plug primitive 70 to the hot-plug system driver 68 requesting the same to allocate biasing power to the appropriate card slot 40, at step 308. In response, the hot-plug system driver 68 uses the hot-plug controller 64 to power the card slot 40 at step 310. At step 312, the slot-status indicator signal 62 may be modified to show that the card slot 40 is powered. At step 314, the hot-plug controller 66 de-asserts the reset signal RST# on the appropriate card slot 40 and connects the card slot 40 to the bus 34. At step 316, the hot-plug service 66 may notify both the operating system 65 and the user the newly hot-plugged adapter card 38 is ready for use. Exemplary pseudo code defining the subroutine stored in ROM 18 that carries-out the functions of the aforementioned steps is as follows:

```
if (event "PCI card insert") then {
        Update "fresh card added on slot x" bitmap
    return
}
if (event "Chassis intrusion switch closed") then {
        Look at "fresh added slots" bitmap
        Send power Up command to all freshly added cards
        clear out "fresh added slots" bitmap
        return
}
```

The embodiments described herein are merely examples of the present invention and should not be construed as limiting the scope of the invention, which should be determined from the breadth of the claims including the full scope of the equivalents thereof.

What is claimed is:

1. A method for allocating power to a card slot in a computer system, said method comprising:
   providing a processor;
   providing a card slot in data communication with said processor, said card slot having one of two states associated therewith;
   providing a power supply in electrical communication with said processor, and said card slot; and
   allocating power from said power supply to said card slot upon the detection of a state change of said card slot and the occurrence of a signal indicating a spatial position of a user with respect to said card slot.

2. The method as recited in claim 1 further comprising the steps of providing a plurality of card slots, a subgroup of which undergo a state change, and allocating power to said card slot includes allocating power to the card slots associated with said subgroup upon the occurrence of the signal indicating the spatial position of the user with respect to said card slot.

3. A method for allocating power to a card slot in a computer system, said method comprising:
   providing a processor;
   providing a card slot in data communication with said processor, said card slot having one of two states associated therewith;
   providing a power supply in electrical communication with said processor, and said card slot;
   providing a chassis defining a chamber with said processor, said card slot, and said power supply, being disposed in said chamber and said chassis including a moveable panel and a wall, with a switch connected between said moveable panel and said wall, said moveable panel having two positions, breached and secured, with said switch having one of two modes, each of which is uniquely associated with one of said two positions; and
   allocating power from said power supply, to said card slot upon the detection of a state change of said card slot and said switch being in the mode associated with said secured position.

4. A method for allocating power to a card slot in a computer system, said method comprising:
   providing a processor;
   providing a card slot in data communication with said processor, said card slot having one of two states associated therewith;
   providing a keyboard having a plurality of keys in data communication with said processor;
   providing a power supply in electrical communication with said processor, and said card slot; and
   allocating power from said power supply, to said card slot upon the detection of a state change of said card slot and the manipulation of a subset of said plurality of keys in a predetermined sequence.

5. A method for allocating power to a card slot in a computer system, said method comprising:
   providing a processor;
   providing a card slot in data communication with said processor, said card slot having one of two states associated therewith;
   providing a power supply in electrical communication with said processor, and said card slot;
   providing a power switch in electrical communication with said power supply; and
   allocating power from said power supply, to said card slot upon both the detection of a state change of said card slot and operation of said power switch.

6. A method for allocating power to an expansion slot in a computer system, said method comprising:
   providing a processor;
   providing a plurality of card slots in data communication with said processor, with each of said plurality of card slots having one of two states associated therewith, with said two states including having an adapter card disposed therein, defining a connected state, and having an adapter card omitted therefrom, defining a disconnected state;
   providing a keyboard having a plurality of keys in data communication with said processor;
   providing a power supply in electrical communication with said processor, said card slot and said memory; and
   allocating power to each of said plurality of card slots that undergo a change of state, from said disconnected state to said connected state, and the occurrence of manipulating a subset of said plurality of keys in a predetermined sequence.

7. A method for allocating power to an expansion slot in a computer system, said method comprising:
   providing a processor;
   providing a plurality of card slots in data communication with said processor, with each of said plurality of card slots having one of two states associated therewith, with said two states including having an adapter card disposed therein, defining a connected state, and having an adapter card omitted therefrom, defining a disconnected state;
   providing a power supply in electrical communication with said processor, said card slot and said memory;
   providing a power switch in data communication with said processor; and
   allocating power to each of said plurality of card slots that undergo a change of state, from said disconnected state to said connected state, and operation of said power switch.

8. A method for allocating power to an expansion slot in a computer system, said method comprising:
   providing a processor;
   providing a plurality of card slots in data communication with said processor, with each of said plurality of card slots having one of two states associated therewith, with said two states including having an adapter card disposed therein, defining a connected state, and having an adapter card omitted therefrom, defining a disconnected state;
   providing a power supply in electrical communication with said processors, said card slot and said memory;
   providing a chassis defining a chamber with said processor, said card slot, and said power supply, being disposed in said chamber and said chassis including a moveable panel and a wall, with said switch being connected between said moveable panel and said wall, said moveable panel having two positions, breached and secured, with said switch having one of two modes, each of which is uniquely associated with one of said two positions; and
   allocating power to each of said plurality of card slots that undergo both a change of state, from said disconnected state to said connected state, and said switch being in the mode associated with said secured position.

9. A computer system comprising:

a processor;

a card slot in data communication with said processor, said card slot being in one of two states;

a memory in data communication with said processor, a power switch in data communication with said processor; and a power supply in electrical communication with said processor, said card slot and said memory, with said memory storing computer-readable data that includes code to be operated on by said processor to allocate power to said card slot upon detection of a change of state of the card slot and activation of said power switch.

10. The computer system as recited in claim 9 wherein said power switch includes an LED and said code includes a first subroutine to detect the state change of said card slot and a second subroutine to illuminate said LED in response to said state change, and a third subroutine to sense an activation of said power switch.

11. A computer system comprising:

a processor;

a card slot in data communication with said processor, said card slot being in one of two states;

a memory in data communication with said processor, and a power supply in electrical communication with said processor, said card slot and said memory, and a chassis defining a chamber with said processor, said card slot, said memory and said power supply, being disposed in said chamber and said chassis including a moveable panel and a wall, with a switch connected between said moveable panel and said wall, said moveable panel having two positions, breached and secured, with said switch having one of two modes, each of which is uniquely associated with one of said two positions;

wherein said memory stores computer-readable data that includes code to be operated on by said processor to allocate power to said card slot upon both a detection of a change of state of the card slot and said switch being in the mode associated with said secured position.

12. A computer system comprising:

a processor;

a card slot in data communication with said processor, said card slot being in one of two states;

a memory in data communication with said processor, a keyboard having a plurality of keys in data communication with said processor; and a power supply in electrical communication with said processor, said card slot and said memory, with said memory storing computer-readable data that includes code to be operated on by said processor to allocate power to said card slot upon both a detection of a change of state of the card slot and manipulation of a subset of said plurality of keys in a predetermined sequence.

* * * * *